United States Patent
Motegi et al.

(10) Patent No.: US 7,336,614 B2
(45) Date of Patent: Feb. 26, 2008

(54) METHOD AND DEVICE FOR CONTROLLING ROUTE AND COMPUTER PROGRAM THEREFOR

(75) Inventors: Shinji Motegi, Kamifukuoka (JP); Kiyohito Yoshihara, Kamifukuoka (JP); Hiroki Horiuchi, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 936 days.

(21) Appl. No.: 10/461,109

(22) Filed: Jun. 12, 2003

(65) Prior Publication Data

US 2003/0231585 A1 Dec. 18, 2003

(30) Foreign Application Priority Data

Jun. 17, 2002 (JP) .......................... P2002-175677

(51) Int. Cl.
*H04L 12/26* (2006.01)
(52) U.S. Cl. ...................... 370/238; 370/249
(58) Field of Classification Search ............... 370/328, 370/338, 345, 349, 389, 392, 250, 238, 238.1, 370/248, 249, 254, 255
See application file for complete search history.

(56) References Cited

U.S. PATENT DOCUMENTS

| | | | | |
|---|---|---|---|---|
| 5,191,650 A | * | 3/1993 | Kramer et al. | 709/227 |
| 5,600,638 A | * | 2/1997 | Bertin et al. | 370/351 |
| 5,649,108 A | * | 7/1997 | Spiegel et al. | 709/241 |
| 6,246,669 B1 | * | 6/2001 | Chevalier et al. | 370/238 |
| 6,256,297 B1 | | 7/2001 | Haferbeck et al. | |
| 2001/0033554 A1 | * | 10/2001 | Ayyagari et al. | 370/328 |
| 2005/0129000 A1 | | 6/2005 | Sivakumar et al. | |

FOREIGN PATENT DOCUMENTS

| | | |
|---|---|---|
| JP | 2001-23875 | 8/2001 |
| JP | 2002-009836 | 1/2002 |
| JP | 2002-064546 | 2/2002 |

OTHER PUBLICATIONS

Marina, et al., "On-demand Multipath Distance Vector Routing in Ad Hoc Networks," ICNP, Nov. 2001.
Shingo Umeshima et al., "Power-Control Routing Protocol for Ad-Hoc Networks", IPSJ SIG Notes, Multimedia Communication and Distributed Processing, 2001-DPS-104-2, vol. 2001, No. 88, pp. 7-12.

* cited by examiner

*Primary Examiner*—Kwang Bin Yao
*Assistant Examiner*—Andrew Lai
(74) *Attorney, Agent, or Firm*—David C. Conlin; William J. Daley, Jr.; Edwards Angell Palmer & Dodge, LLP

(57) ABSTRACT

A method for controlling routes in a network which is temporarily formed among a plurality of nodes. The method includes the steps of broadcasting a discovery demand of a destination node; receiving a first reply from the destination node with respect to the discovery demand; referring a joint count contained in the first reply and registering the joint count in a node which received the reply; adding 1 to the joint count if there is a plurality of nodes forming a plurality of links to which the reply is transferred, and transmitting the reply to each of the links, and selecting one of the links having a smaller registered joint count as a route if there is a plurality of links through which the data is transmitted to the destination node.

8 Claims, 7 Drawing Sheets

FORMAT OF RREQ

FORMAT OF RREP

REGISTRATION AREA IN RREQ

REGISTRATION AREA IN RREQ

METHOD AND DEVICE FOR CONTROLLING ROUTE AND COMPUTER PROGRAM THEREFOR

BACKGROUND OF THE INVENTION

1. Field of the Invention

The present invention relates to a method and a device for controlling routes, and to a computer program used for controlling the routes. More specifically, the present invention relates to a method, a device, and computer program for controlling routes used in a network which is temporary formed among a plurality of nodes, such as a so-called multi-hop network.

2. Description of Related Art

Research and development in so-called multi-hop (or ad hoc) networks have began. A multi-hop network is a network formed by a plurality of nodes, each of which functioning as a router. For example, a home network which is temporarily formed among a plurality of terminals capable of short range communication and in which information consumer electronics are mutually connected by wireless communication called Bluetooth, and a temporary network formed in a conference are presumed to be multi-hop networks.

Here, examples of system used in such networks will be briefly explained. As shown in FIG. 9, routes from the node S from which data are transmitted (hereinafter also referred to as a transmission source node) to the node D to which the data are sent (hereinafter also referred to as a destination node) are supplied through nodes N1-N4 which relay data packets. In the case shown in FIG. 9, if the node N1 moves outside of the network, the link between the node N1 and the node S is broken. However, since the route connecting S, N3, N4, and D is still available, it is possible to connect the node S to the node D by selecting this route while restoring the disconnected route.

On the other hand, if the link between the nodes S and N1 is overlapped as shown in FIG. 10 (in comparison with FIG. 9), all of the routes will be disconnected and cannot be restored if the link between the nodes S and N1 is broken. For this reason, it is necessary to control routes so that the routes will be formed with as few overlapping links as possible as shown in FIG. 9.

As methods for controlling routes in an ad hoc network, Dynamic Source Routing (DSR) method and Ad hoc On-demand Distance Vector Protocol (AODV), for example, are available. Also, a method obtained by expanding the AODV, which is called Ad hoc On-demand Multipath Distance Vector Protocol (AOMDV) has been proposed (refer to M. K. Marina and S. R. Das, "In Proceedings of the International Conference for Network Protocol", November 2001).

The AOMDV is a protocol for forming a plurality of routes which do not contain overlapped links such as the one shown in FIG. 10. Here, the procedure for forming routes using the AOMDV will be explained with reference to FIG. 11. First, the node S broadcasts a message (RREQ) for searching the node D. The message contains an area in which the address of the node which first receives the message will be registered, and nothing is registered at this area when the message is transmitted from the node S. The nodes N1 and N2 which received the message recognize that they are the nodes which first received the message, and registers the address thereof in the above-mentioned area. Then, the nodes N1 and N2 broadcast the message. The node I which received the message from both the nodes N1 and N2, only acquires the message which is received earlier, i.e., the message from N1 in the figure, and abandons the other message, i.e., the message from N2. Then, the node I broadcasts the message, and the message is transmitted to the node D via the nodes N3 and N4 to establish the transfer routes. The node D unicasts a reply message (RREP) to the nodes N3 and N4 which broadcasted the message, and thereafter each of the nodes unicasts a reply message to the node which broadcasted the message to establish feedback routes which are reverse of the transfer routes.

The above-mentioned AOMDV has the following characteristics. Although a message received later is normally abandoned unconditionally if a broadcasted message is received in duplicate, in the AOMDV method, the receiving node (I) refers to the above-mentioned address registration area in the message, and if the address is different from the message (N1) which is already received, a process for renewing the feedback routes is performed, i.e., the node (I) unicasts a RREP to the source node of transmitting the message. In this manner, the node I establishes distinct links N1 and N2 and becomes a relay node at which the two links cross over. As a result, a plurality of routes having no overlapped links are established.

However, in the above-mentioned method, there are the following problems. That is, as shown in FIG. 12, if a plurality of relay nodes X and Y which correspond to the node I and at which plural links cross over, are present, an overlapped link connecting X-N3-Y is generated between the relay nodes X and Y. The reason for the formation of this overlapped link is as follows. The node X, when it receives a RREQ message from the nodes N1 and N2, broadcasts only the message (N1) which is received first. Although the message is broadcasted to the node Y via the nodes N3 and N4, the node Y unconditionally abandons the message which is received later since the addresses thereof are the same (N1). As a result, the route which passes through the node N4 is not established, and the above-mentioned overlapped link is generated.

BRIEF SUMMARY OF THE INVENTION

The present invention was made in consideration of the above situation, and an object of the invention is to provide a method and a device, and a computer program, each of which enables establishing and selecting routes having few overlapped links and overlapped nodes in a network which is temporary formed among a plurality of nodes, such as an ad hoc network.

In order to achieve the above object, the first aspect of the present invention provides a method for controlling routes in a network which is temporary formed among a plurality of nodes, comprising the steps of broadcasting a discovery demand of a destination node; receiving a first reply from the destination node with respect to the discovery demand; referring a joint count contained in the first reply and registering the joint count in a node which received the reply; adding 1 to the joint count if there is a plurality of nodes forming a plurality of links to which the reply is transferred, and transmitting the reply to each of the links, and selecting one of the links having a smaller registered joint count as a route if there is a plurality of links through which the data is transmitted to the destination node. Also, if a certain route is cut or disconnected, it becomes possible to quickly select an alternative route by referring to the joint count.

According to the above method, it becomes possible to create and/or select a route having few overlapped links or nodes by avoiding a route in which a plurality of links are connected to one node because the joint count is increased when there is a plurality of links to which the above reply is transmitted, i.e., when a plurality of links are connected to one node, and a route having a smaller joint count is selected.

In another aspect of the present invention, it is preferable that the above method further comprises the step of renewing the registered joint count when a second reply is received after receiving the first reply if a joint count contained in the second reply is larger than the joint count contained in the first reply.

According to the above method, the state of the network can be accurately reflected to the joint count and the route selection can be accurately carried out based on the joint count since the largest joint count is registered in the node which received the reply.

In yet another aspect of the present invention, it is preferable that the above method further comprises the step of transmitting an error message informing of the breaking of a link if a breaking of a link is detected, wherein it is controlled not to transmit the error message if an alternative route is available to transmit the data to the destination node.

According to the above method, it becomes possible to prevent problems, such as increase in traffic in the network and useless data processing in each node, which may be caused when all of the nodes which received the error message transmit the message.

The present invention also provides a device which controls routes in a network which is temporarily formed among a plurality of nodes, the device being provided in each of the nodes, comprising a broadcasting unit which broadcasts a discovery demand of a destination node; a receiving unit which receives a first reply from the destination node with respect to the discovery demand; a registering unit which refers a joint count contained in the first reply and registers the joint count; a transmitting unit which adds 1 to the joint count if there is a plurality of nodes forming a plurality of links to which the reply is transferred, and transmits the reply to each of the links, and a selecting unit which selects one of the links having a smaller registered joint count as a route if there is a plurality of links through which the data is transmitted to the destination node.

The present invention also provides a computer-readable medium encoded with a computer program which executes the steps of broadcasting a discovery demand of a destination node; receiving a first reply from the destination node with respect to the discovery demand; referring a joint count contained in the first reply and registering the joint count in a node which received the reply; adding 1 to the joint count if there is a plurality of nodes forming a plurality of links to which the reply is transferred, and transmitting the reply to each of the links, and selecting one of the links having a smaller registered joint count as a route if there is a plurality of links through which the data is transmitted to the destination node.

BRIEF DESCRIPTION OF THE SEVERAL VIEWS OF THE DRAWINGS

Some of the features and advantages of the invention having been described, others will become apparent from the detailed description which follows, and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use one particular implementation of the invention, is not intended to limit the enumerated claims, but to serve as a particular example thereof.

Figure 1:
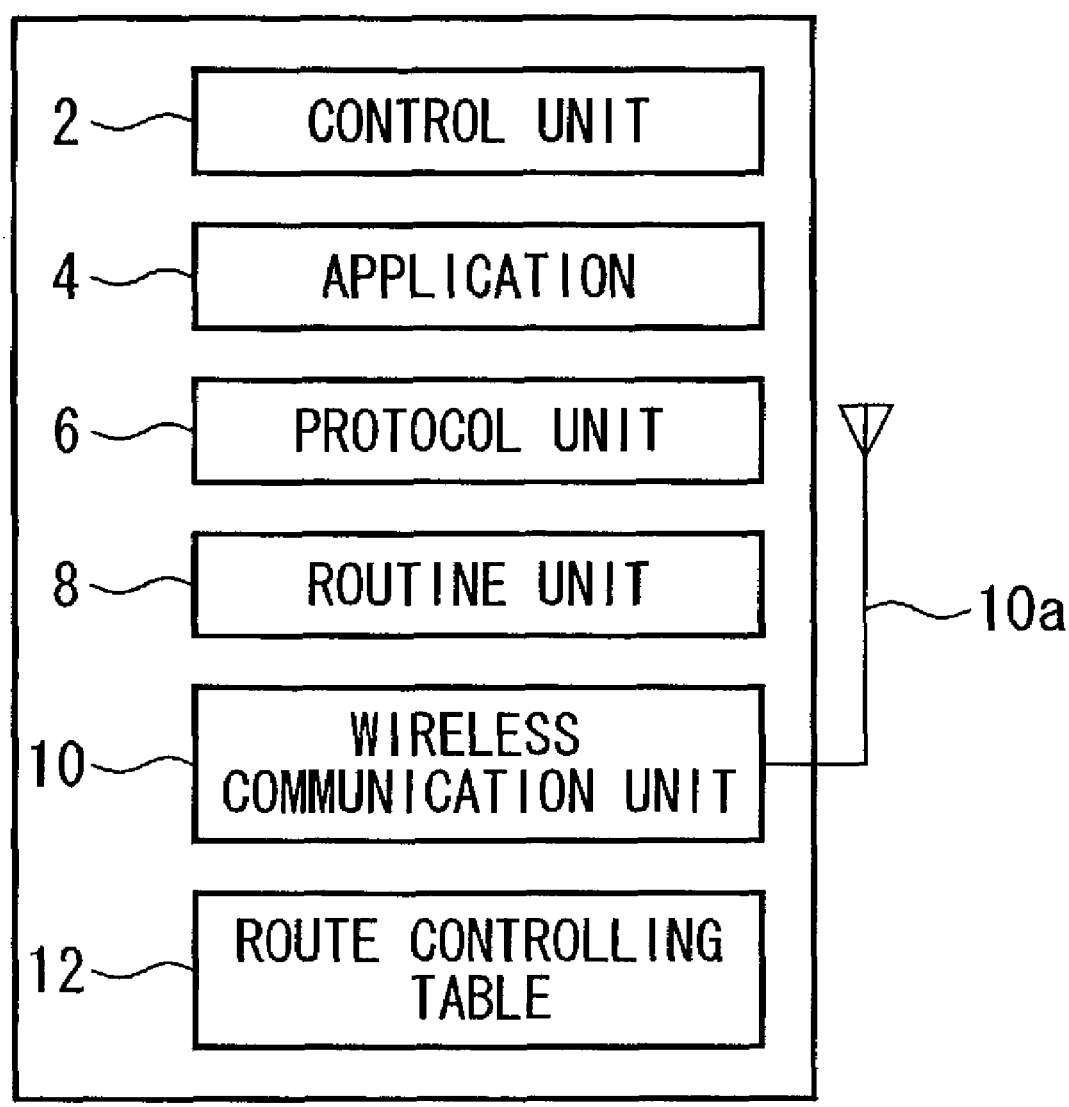
FIG. 1 is a schematic block diagram showing the structure of a node (terminal) which forms a temporary network.

Hereinafter, embodiments of the present invention will be explained with reference to the accompanying drawings. FIG. 1 is a block diagram showing an example of the structure of a node (terminal) which temporarily forms a network to which the present invention is applied. Note that in this embodiment, it is assumed that each of the nodes may function as a transmission source node S, a destination node D, and a (relay) node N.

As shown in FIG. 1, each of the nodes includes a control unit (route controlling device) 2 which controls the entire node, an application (computer program) 4, a protocol unit 6, a routine-performing unit 8, a wireless communication unit 10, and a route controlling table 12. In the application 4, various processes carried out in the present invention are recorded. The protocol unit 6 performs a predetermined protocol control. The routine-performing unit 8 performs a routine program of a computer. The wireless communication unit 10 is used to make wireless communication with the other nodes via a wireless communication antenna 10a. The route controlling table 12 is used to register various information for controlling routes.

Figure 2:
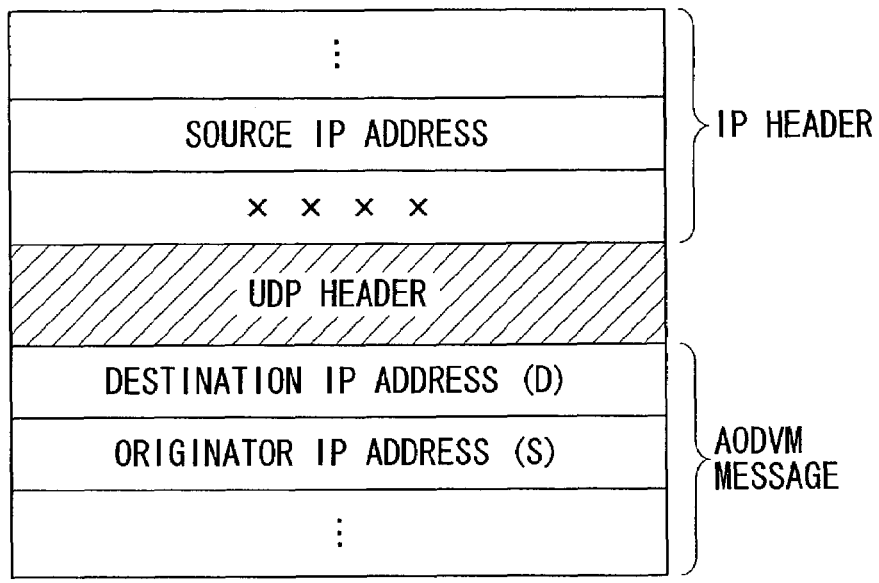
FIG. 2 is a diagram showing a format of a discovery demand message (RREQ) of a destination node.
Figure 3:
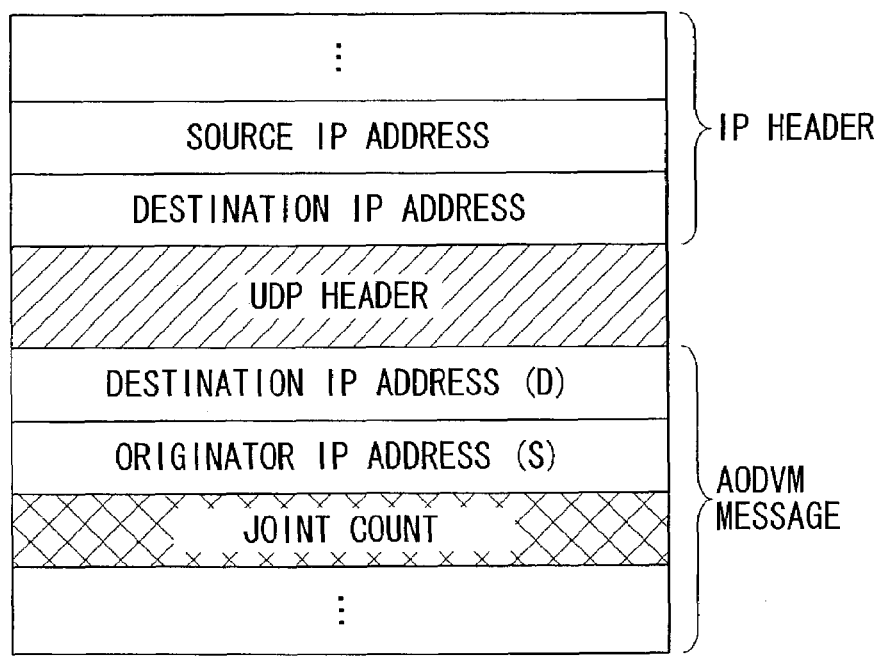
FIG. 3 is a diagram showing a format of a reply message (RREP) to the RREQ.

FIG. 2 is a diagram showing an example of the format of a discovery demand message (RREQ) of a destination node, and FIG. 3 is a diagram showing an example of the format of a reply message (RREP) corresponding to the RREQ. In FIG. 2, the RREQ includes an IP header, a UDP header, and an AODVM (AODV based Multipath routing) message used in the present invention. In the IP header, an address of the RREQ source (Source IP address) is recorded. Also, the Destination IP address and the Originator IP address contained in the AODVM message define the destination (D) and the source (S), respectively. These formats are the same as those used in the conventional AODV.

In FIG. 3, the RREP includes an IP header, a UDP header, and an AODVM message, and addresses of the RREP source (Source IP address and Destination IP address) are recorded in the IP header. Note that the characteristics of the present invention include to provide a joint count field in the AODVM message as shown in the figure. This will be explained in detail later.

Figure 4:
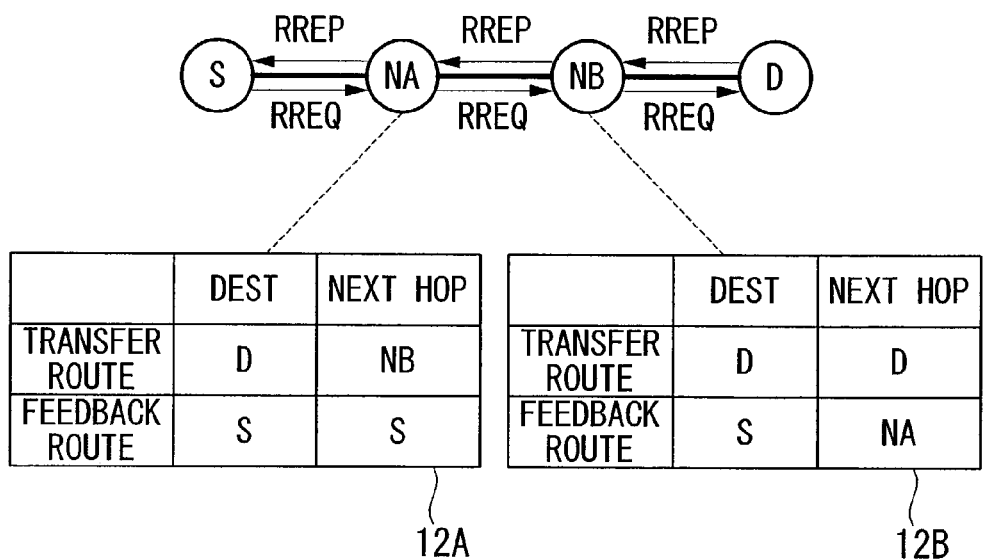
FIG. 4 is a diagram showing basic procedure for controlling routes carried out by a node.

Next, basic procedures for controlling routes performed by a node which received the above-mentioned RREQ or RREP will be explained with reference to FIG. 4. A case is considered where routes are created between the transmission source node S and the destination node D via the relay nodes NA and NB as shown in the figure. First, the node S broadcasts the RREQ. The RREQ is transferred to the node D via the nodes NA and NB in this order. At that time, each of the nodes NA and NB registers the following information as "feedback routes" in its route controlling table 12A and 12B, respectively. The feedback route is used to return to the node S, and "S" is registered in the item of "Dest(ination)" and the node from which the RREQ was received is registered in the item of "Next hop". The IP header of the RREQ is referred to determine from which node the RREQ was received.

On the other hand, the node D, when it receives the RREQ, transmits (unicasts) the RREP to the source node which is obtained from the IP header of the RREQ. The RREP reaches the node S via the nodes NB and NA in this order. At that time, each of the nodes NA and NB registers the following information as "transfer routes" in its route controlling table 12A and 12B, respectively. The transfer route is used to send data to the node D, and "D" is registered in the item of "Des(tination)" and the node from which the RREP was received is registered in the item of "Next hop". The IP header of the RREP is referred to determine from which node the RREP was received. When the feedback route and the transfer route are obtained as explained above, routes between the nodes are formed.

Figure 5:
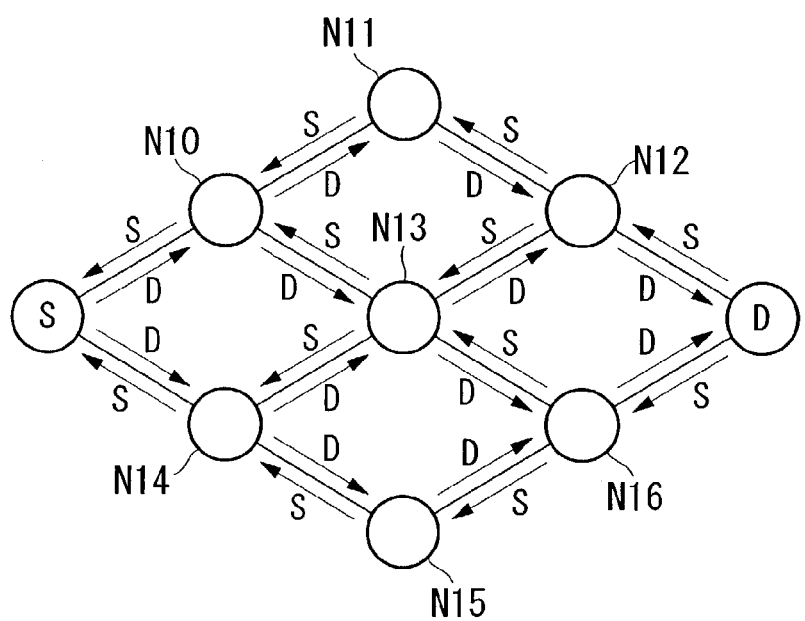
FIG. 5 is a diagram showing the structure of entire network formed by the nodes.

Next, control of routes in an actual network will be explained with reference to FIG. 5. FIG. 5 is a diagram showing the overall structure of a network formed by a plurality of nodes. In FIG. 5, the network is formed by the nodes S, D and a plurality of relay nodes N10-N16. Links (wireless communication network) formed between each of the nodes are indicated by solid lines.

In the network shown in FIG. 5, when the node S broadcasts the RREQ, each of the nodes records node(s) which becomes the route (feedback route) to the node S in its route controlling table based on the received RREQ. Each of the arrows S shown in FIG. 5 indicates a feedback route for each of the nodes, and the node(s) which becomes the route to the node S is indicated by the pointing direction of the arrow. When the RREQ is broadcasted to the node D, the node D transmits (unicasts) the RREP. The RREP reaches the node S when each of the nodes transfers the received RREP to the node S using the already established feedback route. At that time, each of the nodes records node(s) which becomes the route (transfer route) to the node D in its route controlling table based on the received RREP. Each of the arrows D shown in FIG. 5 indicates a transfer route for each of the nodes, and the node(s) which becomes the route to the node D is indicated by the pointing direction of the arrow. In the manner shown in FIG. 5, both the feedback route and the transfer route are always formed between each of the nodes. That is, according to the embodiment of the present invention, since a RREQ received later is not abandoned based on the address registry area in the RREQ as in the conventional AOMDV, there is no danger that an overlapped route will be formed due to a non-formation of a route between nodes.

However, in the case where created routes are randomly used, simple plural routes are formed and some of which may contain overlapped links. Accordingly, the following process is provided in the embodiment of the present invention so that a route which does not contain overlapped links can be selected.

Figure 6:
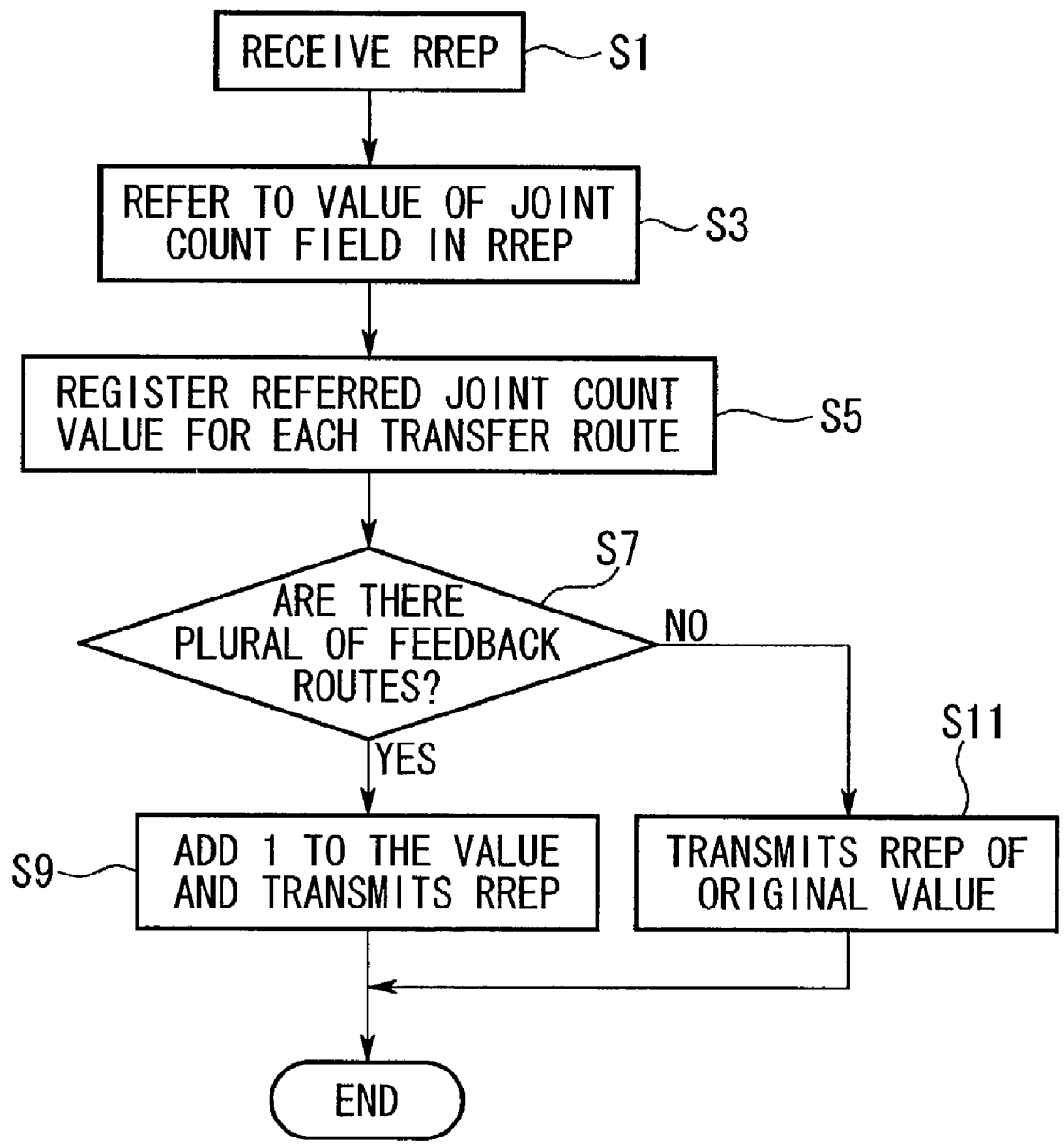
FIG. 6 is a flowchart showing the procedure carried out by each of the nodes which received the RREP.

In this process, each of the nodes carries out the procedure shown in the flowchart of FIG. 6. In the flowchart shown in FIG. 6, each of the nodes N10-N16 first receives the RREP (step S1). In the RREP, the joint count field shown in FIG. 3 is provided, and each of the nodes refers the value (the joint count) thereof (step S3). Here, the joint count is set to be zero whenever the destination node D transmits the RREP. Each of the nodes registers the referred value (the referred joint count) for each transfer route in the route controlling table (step S5).

Then, each of the nodes determines whether there are a plurality of feedback routes to which the RREP should be transmitted, by referring to the route controlling table thereof (step S7). Here, it is determined whether plural nodes are registered in the item of "Next hop" of the feedback route. If the result is "Yes" in step S7, each of the nodes adds "1" to the value of the joint count field of the RREP, and transmits the resultant value to the next node (Next hop) (step S9). On the other hand, if the result is "No" in step S7, each of the nodes transmits the RREP of original value (i.e., the referred joint count) to the next node (step S11).

Each of the following Tables 1 and 2 shows data of the route controlling table of each node used in the procedure shown in the flowchart of FIG. 6. Tables 1 and 2 are data of route controlling tables of nodes N16 and N14, respectively, shown in FIG. 5.

TABLE 1

Route controlling table of N16

|  | Dest | Next hop | Joint count |
|---|---|---|---|
| Transfer route | D | D | 0 |
| Feedback route | S | N13 | |
| | S | N15 | |

TABLE 2

Route controlling table of N14

|  | Dest | Next hop | Joint count |
|---|---|---|---|
| Transfer route | D | N13 | 2 |
| Feedback route | D | N15 | 1 |
| | S | S | |

In the Table 1, the joint count contained in the RREP is zero since the node N16 directly receives the RREP form the node D. Accordingly, "0" is registered in the "Joint count" field of the transfer route (the transmitting route to the node D). On the other hand, there are two feedback routes for the node N16, one is to the node N13 and the other is to the node N15. Accordingly, the result of determination in the above-mentioned step S7 will be "Yes". Therefore, the node N16 transmits the RREP having the joint count of "1" (i.e., 1 is added to 0) to each of the nodes N13 and N15.

Figure 7:
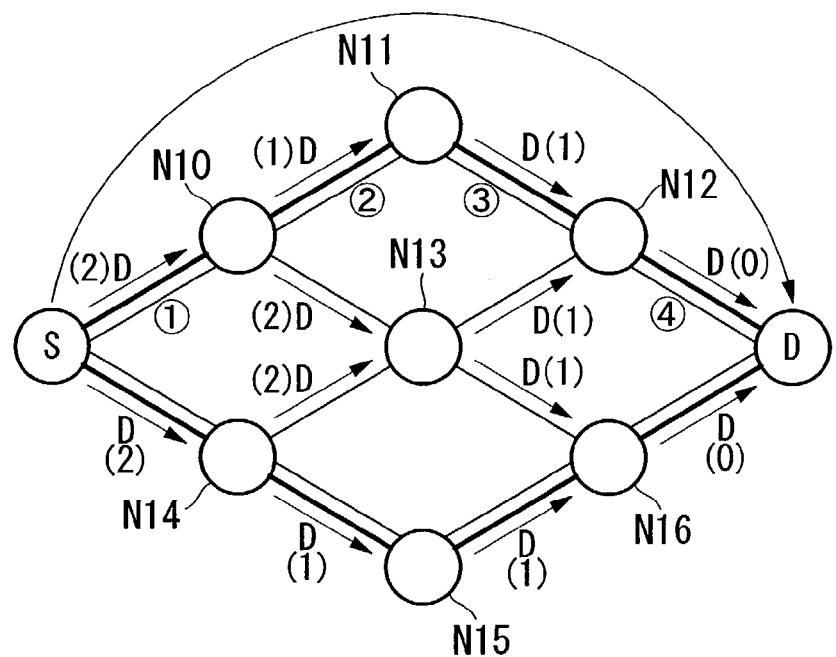
FIG. 7 is a diagram showing joint counts set for each of the links.

Also, in Table 2, the node N14 receives the RREP from each of the nodes N13 and N15. Here, as shown in FIG. 7, the joint count of the RREP transmitted from the node N13 is 2, and the joint count of the RREP transmitted from the node N15 is 1. Accordingly, among the transfer routes (transmitting routes to the node D), the "next hop" registers "2" in the "joint count" field of the node N13, and the "next hop" registers "1" in the "joint count" field of the node N15. On the other hand, the feedback route for the node N14 is only one, and the result of determination in the above-mentioned step S7 becomes "No". Accordingly, the node N14 transmits the RREP whose joint count has not been changed to the node S.

In the case where a plurality of transfer routes exist, as it does for the node N14, there may occur the following problems. That is, since the nodes that transmit the RREP to the node S are overlapped by the number of the transfer routes, there is a problem for the node S regarding which value of the joint count should be registered that is contained in the RREP received from each of the nodes. Accordingly, the receiving node (S) of the RREP, when it received a RREP after receiving another RREP, changes the joint count if the joint count contained in the RREP received later is larger than the joint count already registered in the table. In this manner, the state of the network is accurately reflected to the joint count since the largest joint count is registered in the receiving node of the RREP, and hence, a route selection based on the joint count can be accurately carried out.

In accordance with the procedure explained above, the joint count for each transfer route is registered in the table of each node as shown in FIG. 7. Note that in FIG. 7, the nodes N10 and N14, for example, are present as transfer routes for the node S. This is indicated by each of the arrows D shown in the figure, and the number shown in parentheses, e.g., 2, indicates the joint count.

Next, a method for selecting a route using the joint count shown in the above-mentioned FIG. 7 will be explained. First, the node S refers to its route controlling table and transfers data (packet) which is transmitted to the destination node D, using one of the two transfer routes of the node N10 and the node N14 which has a fewer joint count. In this embodiment, since the joint count of both of the transfer routes is the same value (i.e., 2), the node S randomly determines the transfer route. In FIG. 7, it is assumed that the transfer route ① (i.e., N10) is selected.

Then, the node N10 which received the data refers to the route controlling table thereof, and transfers the data using one of the two transfer routes of the node N11 and the node N14 having lower joint count. In this embodiment, since the joint count of the transfer route passing through the node N11 is lower, the transfer route ② is selected.

For the case of the nodes N11 and N12, respectively, since there is only one transfer route for each of the nodes, the transfer routes ③ and ④, respectively, are selected. In this manner, the route ①-④ shown in the figure is selected. Note that this route is the route having the lowest probability of causing problems, such as breaking or disconnection of the route, since the route contains no overlapped links and no overlapped relay nodes. Similarly, in the case shown in the figure, the route of S-N14-N15-N16-D also does not contain overlapped links and overlapped relay nodes.

In the meantime, when the route is cut or disconnected, the node belonging to the disconnected link broadcasts an error message which informs the generation of disconnection using the feedback route. However, there is a danger of increasing traffic of the network or generating useless data processing in each node if all of the nodes that received the error message sequentially broadcast the error message. Accordingly, in this embodiment of the present invention, a transmission control of an error message is carried out as shown in FIG. 8.

Figure 8:
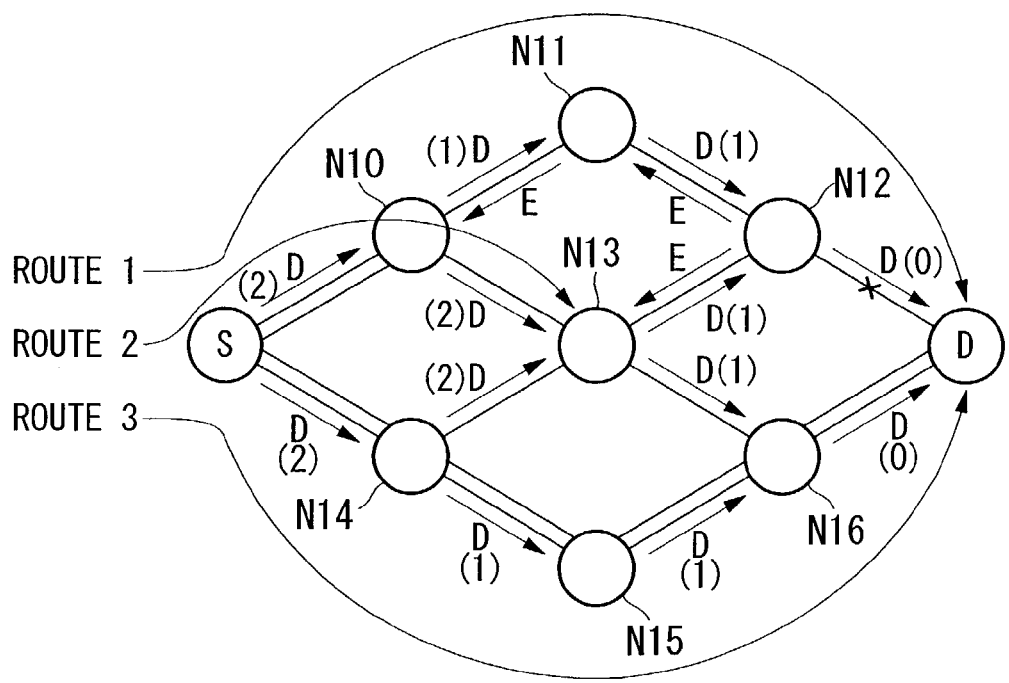
FIG. 8 is a diagram for explaining a procedure for selecting an alternative route when a route is disconnected.
Figure 9:
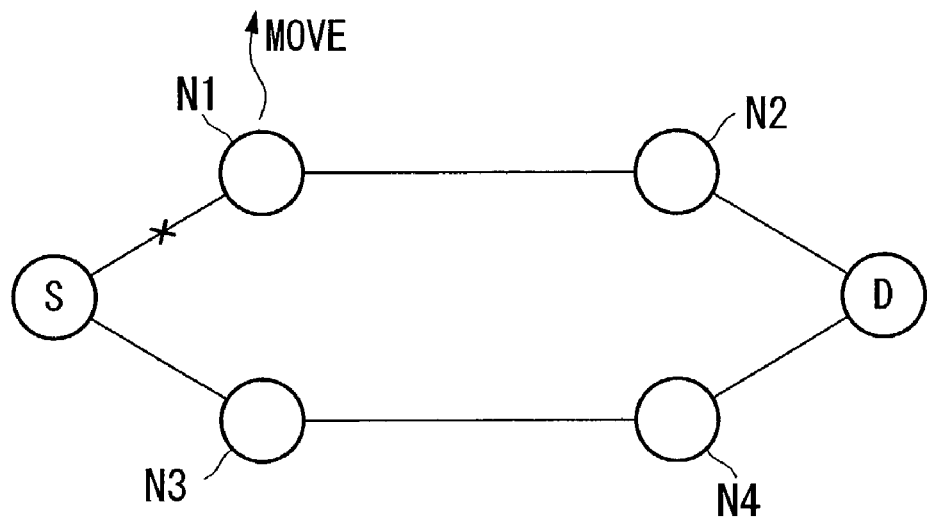
FIG. 9 is a diagram for explaining a conventional route selection in a multi-hop network.
Figure 10:
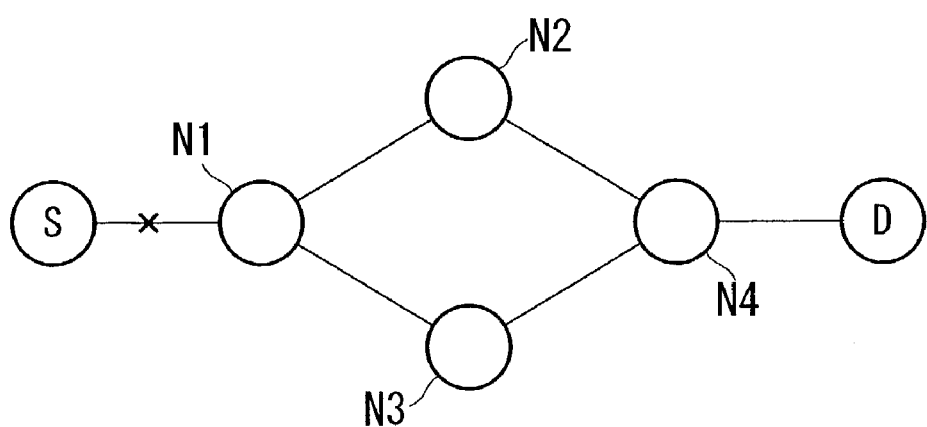
FIG. 10 is another diagram for explaining a conventional route selection in a multi-hop network.
Figure 11:
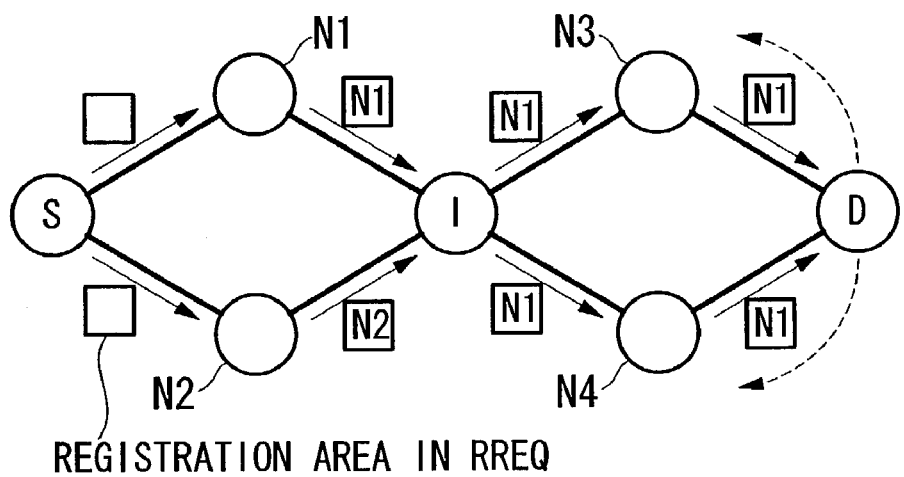
FIG. 11 is yet another diagram for explaining a conventional route selection in a multi-hop network.
Figure 12:
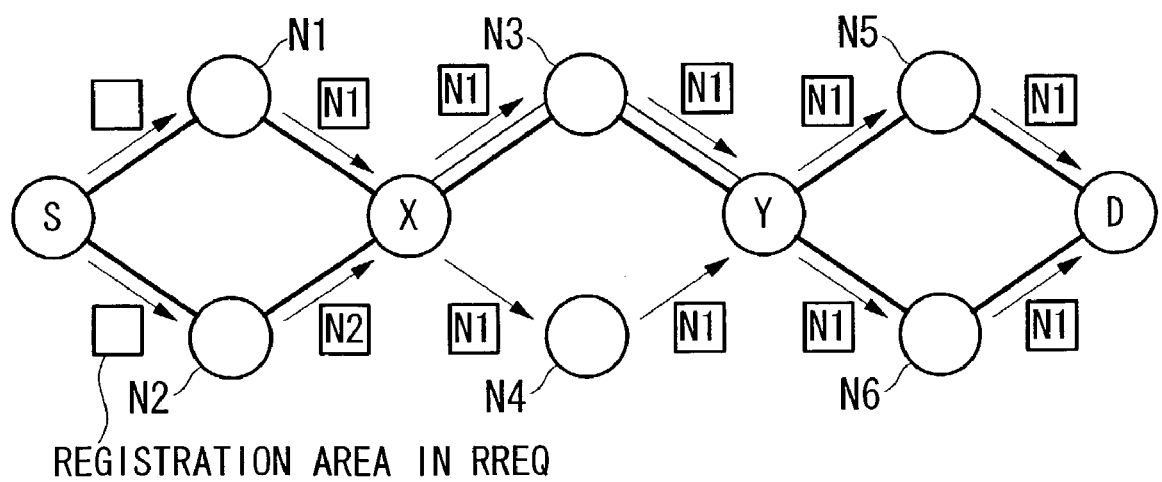
FIG. 12 is yet another diagram for explaining a conventional route selection in a multi-hop network.

In the case shown in FIG. 8, it is assumed that the link between the nodes N12 and D is disconnected (route 1) as indicated by a crossing mark. The node N12 which belongs to the disconnected link detects the disconnection and broadcasts an error message (indicated by the arrows E in the figure). Here, the broadcast of 1HOP is considered. The node N11 which received the message from the node N12, refers to the route control table thereof, and recognizes that the number of transfer routes is one (from the node 11 to the node N12). It has been set that each node broadcasts an error message when there is only one transfer route, i.e., when there is no alternative route for avoiding the disconnected link, and hence, the node N11 broadcasts the error message. Also, the node N11 flags the transfer route contained in the route controlling table indicating that the route is disconnected.

The node N13 which received the error message from the node N12, on the other hand, refers the route controlling table thereof, and recognizes that there are two transfer routes (i.e., from N13 to N12, and from N13 to N16). Since it has been set that each node does not broadcasts an error message, and selects an alternative route which does not passes through the disconnected link when there are two or more transfer routes, the node N13 does not broadcast the error message. Similarly, the node N10 which received the error message from the node N11 does not broadcast the error message since there are two transfer routes (i.e., from N10 to N11, and from N10 to N13). In this manner, it becomes possible to decrease the number of broadcastings of the error message to the lowest level. Note that the nodes N13 and N10 give a flag to the disconnected route among the transfer routes contained in the route controlling table thereof.

Next, a method for selecting an alternative route based on the above-mentioned error message will be explained. First, the node S randomly selects a route from the two transfer routes of the nodes N10 and N14 having the same joint count, and transfers the data which is transmitted to the destination node D in the same manner as explained for the above-mentioned FIG. 7. Here, if the route passing through the node N14 is selected, the route 3 of S-N14-N15-N16-D shown in FIG. 8 in which no overlapped links and no overlapped nodes are present will be selected as explained above. On the other hand, if the route passing through the node N10 is selected, the node N10 refers to the flag of the transfer route contained in the route controlling table, and recognizes that the route through the node N11 has been disconnected. Accordingly, the node N10 selects a transfer route which has no flag (i.e., the route through the node N13), and transfers the data thereto. Similarly, the node N13 which received the data refers to the route controlling table and selects a route having no flag (i.e., the route through the node N16) so that the data will be transferred through the selected route. Then, the node N16 transfers the data to the node D. In this manner, the route 2 shown in FIG. 8 is selected.

Note that the method for controlling routes according to the present invention may be realized by using a computer, various accessories, such as a communication device, and a software program which is executed by the computer. The software program which is executed in the above system may be distributed through a computer readable storage medium or communication network.

Having thus described several exemplary embodiments of the invention, it will be apparent that various alterations and modifications will readily occur to those skilled in the art. Such alterations and modifications, though not expressly described above, are nonetheless intended and implied to be within the spirit and scope of the invention. Accordingly, the foregoing discussion is intended to be illustrative only, the invention is limited and defined only by the following claims and equivalents thereto.

What is claimed is:

1. A method for controlling routes in a network for transmitting information from a source to a destination which network temporarily formed among a plurality of nodes between the source and destination, comprising the steps of:
broadcasting a discovery demand of the destination node and each node of the plurality of nodes;
receiving a first reply from said destination node with respect to the discovery demand;
referring a joint count contained in the first reply and registering the joint count in one of the nodes which received the reply;
adding 1 to the joint count when it is determined that there is a plurality of nodes forming a plurality of links to said each node of the plurality of nodes, and transmitting the reply to each of the links; and
selecting one of the routes having a smaller registered joint count as a transmission route for the transmission of information if there is a plurality of routes through which the data is transmitted to said destination node.

2. A method for controlling routes according to claim 1, further comprising the step of:
renewing the registered joint count when a second reply is received after receiving the first reply if a joint count contained in the second reply is larger than the joint count contained in the first reply.

3. A method for controlling routes according to claim 1 or 2, further comprising the step of:
transmitting an error message informing of a disconnection of any of the links if a disconnection of a link is detected, wherein
it is controlled not to transmit the error message if an alternative route is available to transmit the data to said destination node.

4. A device which controls routes in a network for transmitting information from a source to a destination which network is temporarily formed among a plurality of nodes between the source and destination, said device being provided in each of the nodes and comprising:
a broadcasting unit which broadcasts a discovery demand of the destination node and each of the plurality of nodes;
a receiving unit which receives a first reply from said destination node with respect to the discovery demand;
a registering unit which refers a joint count contained in the first reply and registers the joint count;
a transmitting unit which adds 1 to the joint count when it is determined that there is a plurality of nodes forming a plurality of links to said each of the plurality of nodes, and transmits the reply to each of the links, and
a selecting unit which selects one of the routes having a smaller registered joint count as a transmission route for the transmission of information if there is the plurality of links through which the data is transmitted to said destination node.

5. A computer-readable medium encoded with a computer program including logic which executes the steps of:
broadcasting a discovery demand of the destination node and each node of the plurality of nodes;
receiving a first reply from said destination node with respect to the discovery demand;
referring a joint count contained in the first reply and registering the joint count in a node which received the reply;
adding 1 to the joint count when it is determined that there is a plurality of nodes forming a plurality of links to said each node of the plurality of nodes, and transmitting the reply to each of the links, and
selecting one of the links having a smaller registered joint count as a transmission route for the transmission of information if there is the plurality of links through which the data is transmitted to said destination node.

6. A method for controlling routes according to claim 1, further comprising the step of:
transmitting information from said each node of the plurality of nodes to a subsequent node in the selected one route.

7. The device of claim 4, where the transmitting unit transmits information from said each node of the plurality of nodes to another of the plurality of nodes, in the selected route.

8. The computer readable medium of claim 5, wherein the logic executes the step of:
transmitting information from said each node of the plurality of nodes to a subsequent node in the selected one route.

* * * * *